United States Patent
Niitti

(10) Patent No.: US 7,179,374 B2
(45) Date of Patent: Feb. 20, 2007

(54) DEVICE FOR SHEAR-THINNING OF SOLIDS CONTAINING MATERIAL

(75) Inventor: Timo Niitti, Espoo (FI)

(73) Assignee: Outokumpu Technology Oy, Espoo (FI)

( * ) Notice: Subject to any disclaimer, the term of this patent is extended or adjusted under 35 U.S.C. 154(b) by 0 days.

(21) Appl. No.: 11/073,105

(22) Filed: Mar. 3, 2005

(65) Prior Publication Data
US 2005/0150822 A1 Jul. 14, 2005

(30) Foreign Application Priority Data
Mar. 3, 2004 (FI) ................................. 20040336

(51) Int. Cl.
*B01D 35/00* (2006.01)
(52) U.S. Cl. .................. 210/173; 210/194; 210/532.1
(58) Field of Classification Search ........ 210/513–540, 210/173–174, 194
See application file for complete search history.

(56) References Cited

U.S. PATENT DOCUMENTS

| | | | | |
|---|---|---|---|---|
| 2,874,850 A | * | 2/1959 | Unthank | 210/519 |
| 2,954,049 A | * | 9/1960 | Wallace | 137/590 |
| 2,976,690 A | * | 3/1961 | Allred et al. | 405/58 |
| 3,171,807 A | * | 3/1965 | Neuman | 210/319 |
| 3,196,095 A | * | 7/1965 | Wadsworth | 204/545 |
| 3,360,301 A | * | 12/1967 | Donaho, Jr. | 406/136 |
| 6,340,033 B2 | | 1/2002 | Paradis et al. | 137/563 |
| 6,348,087 B1 | * | 2/2002 | Aslin | 96/210 |

FOREIGN PATENT DOCUMENTS

JP 63306354 A * 12/1988

* cited by examiner

*Primary Examiner*—Chester T. Barry
(74) *Attorney, Agent, or Firm*—Morgan & Finnegan, LLP

(57) ABSTRACT

The invention relates to a device to be used in connection with thickening and clarifying apparatuses for shear-thinning of solids containing material, such as slurry, which device contains one conduit for feeding material to be shear-thinnned and another conduit for discharging back the shear-thinned material between a thickening apparatus and the shear-thinning apparatus. The conduit (3,23) for feeding material to be shear-thinned and another conduit (4,24) for discharging back the shear-thinned material are positioned essentially concentrically to each other at least in the ends connected to the thickening apparatus (2,22).

9 Claims, 2 Drawing Sheets

DEVICE FOR SHEAR-THINNING OF SOLIDS CONTAINING MATERIAL

Figure 1:
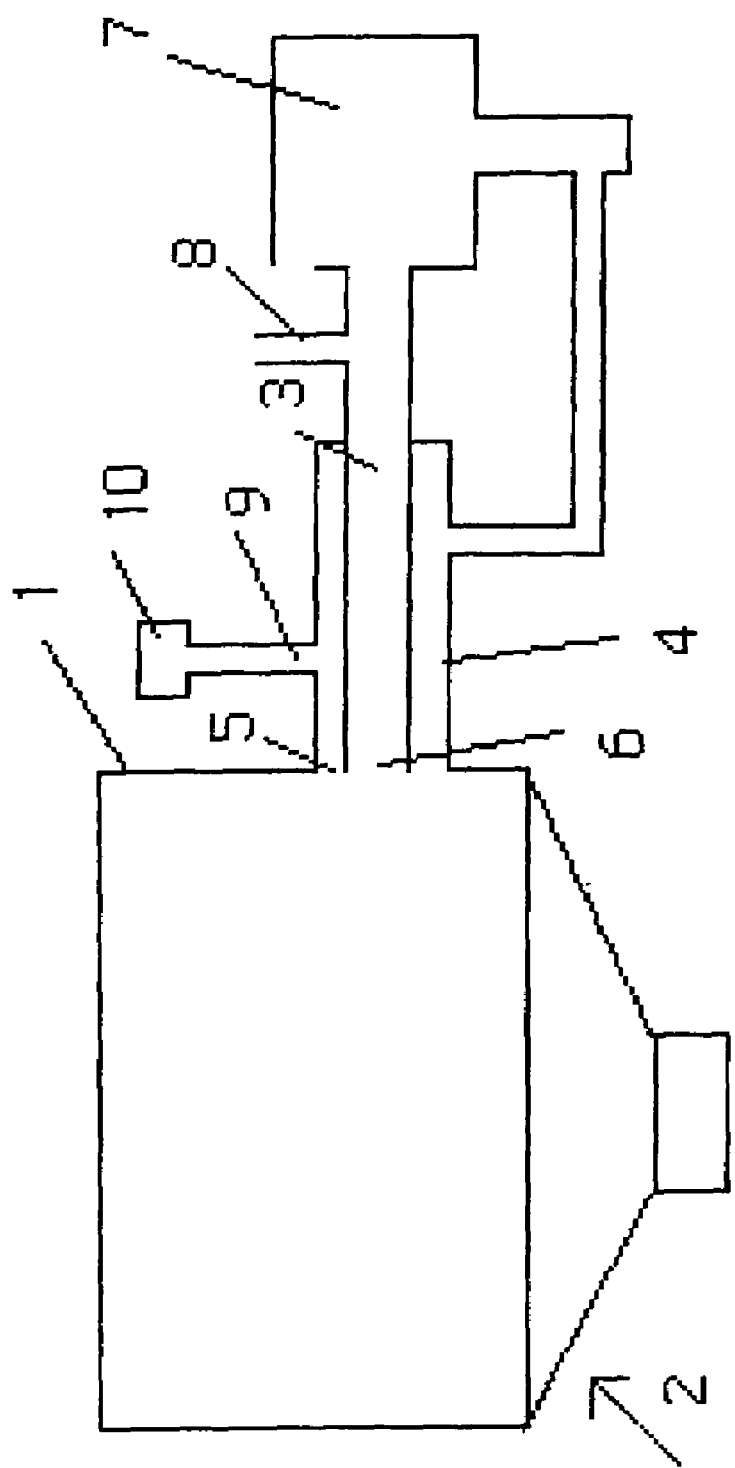

This invention relates to a device to be used in connection with thickening and clarifying apparatuses for shear-thinning of solids containing material such as slurry having high-viscosity.

The aim of thickening is to remove as much water as possible from material containing solids, e.g. mineral slurry. The most effective thickeners can achieve so high pulp densities that the viscosity (consistency) of the material becomes too high for effective discharging of the said underflow product. A phenomenon called shear-thinning can be used to reduce the viscosity of the material and hence enable effective discharge of the said product.

In U.S. Pat. No. 6,340,033 there is provided a method and an apparatus for holding and delivering a slurry having a viscosity so high that direct withdrawal of a flow of the slurry from a reservoir holding a body of the slurry is difficult. The apparatus preferably comprises a first conduit having an inlet in the reservoir for withdrawing slurry from the submerged region, shear generating means communicating with the first conduit for subjecting withdrawn slurry from the first conduit to shear, a second conduit communicating with the shear generating means, having an outlet in the reservoir, for returning shear-thinned slurry of reduced viscosity from the shear generating means to the submerged region of the body, the inlet and the outlet being spaced from each other in the region, thereby creating the stream between the inlet and the outlet. The inlet is located preferably at a short distance, e.g. between 0.2 and about 10 meters, from the outlet. If this distance is too short, The sheared material may simply recirculate and not mix with the unsheared material and hence the withdrawn material may not have been effected by the shear thinning system. Further, the ratio of slurry re-circulated over the net amount of material evacuated can vary from 0.25 to 10:1 depending on the apparent viscosity of the mud after shearing. If the ends of the conduits are located at a distance from each other again does not ensure that the withdrawn material is shear thinned. That does not ensure the effective mixing of the unsheared and sheared material with the thickener to result in the withdrawn material having a lower viscosity.

The object of the present invention is to eliminate some drawbacks of the prior art and to achieve an improved device to be used in connection with thickening and clarifying apparatuses for shear-thinning of material containing solids such as slurry particularly in the solutions used in thickening and clarifying apparatuses. The essential features of the present invention are enlisted in the appended claims.

In accordance with the invention, the apparatus for shear-thinning of slurry to be used in thickening and clarifying apparatuses is connected to a thickener by two conduits so that the openings of the conduits are installed in the wall of the thickener. The openings for the conduits are preferably positioned to each other essentially concentrically within the same surface when relating to the movement of slurry in those openings. The openings for the conduits are of a different size so that one of the openings is situated inside the other opening. One of the openings is for feeding slurry from the thickener to be shear-thinned and one of the openings is for discharging the shear-thinned slurry back into the thickener. The device for shear-thinning further contains at least one pump for shear-thinning and advantageously at least one pump for discharging the shear-thinned material. The device of the invention can also be done using the same pump for both the thinning and for the thickener discharge tasks. Then a control system for the revolution of the pump and the valve operation is necessary to balance the amount of the thinning flow and the discharge flow. Typically a centrifugal pump is used for shear-thinning. In some solutions a cyclic movement is beneficial for the thinning of the slurry. Then a stroke diaphragm pump can be used instead of a centrifugal pump.

In a preferred embodiment of the invention, the device is installed so that the conduit inside the other conduit is used for feeding the material to be shear-thinned from the thickener into the shear-thinning pump. The other conduit is surrounding the inside conduit and this surrounding conduit is used for discharging the shear-thinned material back into the thickener. When the surrounding conduit is used as a discharge conduit of the shear-thinning pump then the discharged and shear-thinned slurry is effectively mixed with slurry ingoing for the shear-thinning. A part of the shear-thinned material is, however, before returning into the thickener, channeled into a separate conduit in order to be removed for further processing.

In another preferred embodiment of the invention, the device is installed so that the conduit having a greater dimension is used for feeding the material to be shear-thinned from the thickener into the shear-thinning pump. The smaller conduit inside the conduit having a great dimension is then used for discharging the shear-thinned material back into thickener. Also in this embodiment, a part of the shear-thinned material is, before returning into the thickener, channeled into a conduit in order to be removed for further processing. The larger area of the feeding conduit makes it easier for the slurry to be suck into the shear-thinned pump and discharging the shear-thinned slurry through the smaller inner conduit provides higher kinetic energy to the flow of the shear-thinned slurry so that this flow can enter deep into the thickener boot and makes the slurry thin there. This arrangement using the smaller conduit for discharging the shear-thinned material into the thickener is beneficial for such cases where the thickener discharge takes place from the bottom cone of the thickener.

Using essentially concentric feeding and discharge openings for the slurry the discharged and returned thinned slurry from the device for shear-thinning mixes with the thick slurry close to the feeding opening of the suction and thus improves the feed flow of the thick slurry into the shear thinning. The openings for the concentric conduits in the wall of the thickener according to the invention are positioned so that the conduits are installed essentially perpendicular to the wall of the thickener. The openings for the concentric conduits can also be positioned so that the conduits are positioned essentially tangentially to the wall of the thickener. When installing the conduits essentially tangentially into the wall of the thickener then the slurry discharged from the shear-thinning will be set into a rotating movement in the discharge boot. The conduits can also be directed downwards in relation to the wall of the thickener if more effective shear-thinning is needed close to the bottom of the thickener boot e.g. for more effective discharge.

Figure 2:
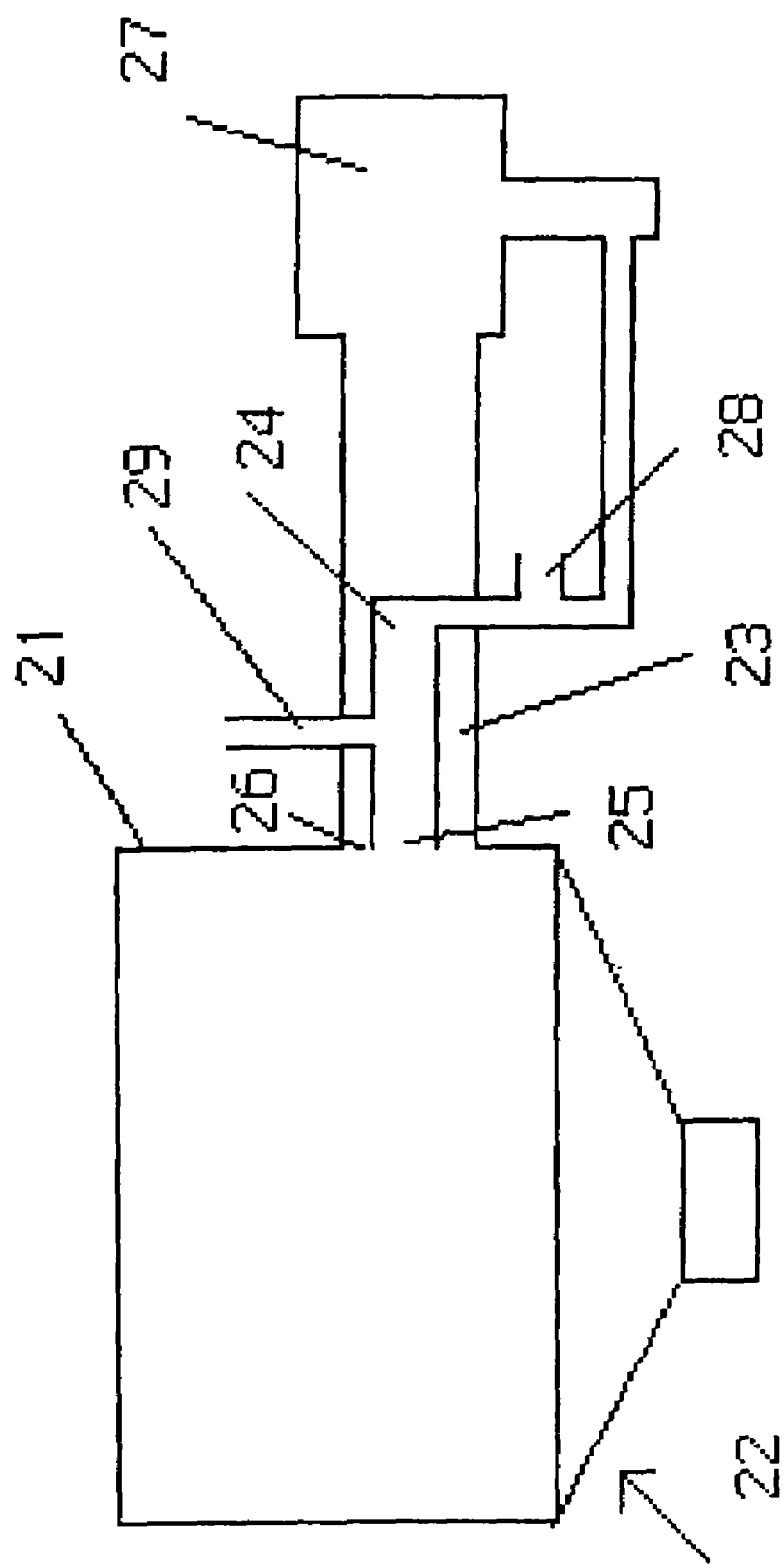

The invention is described in the following in more details referring to the appended drawings, in which FIG. 1 shows a preferred embodiment of the invention in a partly cut side view in schematic manner, FIG. 2 shows another preferred embodiment of the invention in a partly cut side view in schematic manner.

In accordance with FIG. 1 in a wall 1 of a thickener 2 two conduits 3 and 4 are installed so that the conduit 3 is concentrically positioned inside the conduit 4. Thus the conduit 3 has a smaller external dimension than the conduit 4. The end of the conduit 4 having a larger external dimension which end is attached to the wall 1 of the thickener 2 forms an opening 5 for the conduit 4. The conduit 3 having a smaller external dimension is installed inside the conduit 4 so that the end of the conduit 3 forms an opening 6, which is situated in the same surface with the opening 5 of the conduit 4.

The conduit 3 inside the conduit 4 is connected to a shear-thinning pump 7 and thus the conduit 3 operates as a feeding conduit for slurry to be shear-thinned by means of the pump 7. The conduit 3 is also provided with a connection 8 for dilution water to be fed into the slurry to be shear-thinned. The pump 7 is further connected to the conduit 4 through which the shear-thinned slurry is discharged back into the thickener 2. The conduit 4 is provided with a connection 9 through which part of the shear-thinned slurry is discharged without any passage into the thickener 2 for further processing. The connection 9 is provided with a pump 10 in order to intensify the discharge for further processing.

In accordance with FIG. 2 in a wall 21 of a thickener 22 two conduits 23 and 24 are installed so that the conduit 23 is concentrically positioned inside the conduit 24. Thus the conduit 23 has a smaller external dimension than the conduit 24. The end of the conduit 24 having a larger external dimension which end is attached to the wall 21 of the thickener 22 forms an opening 25 for the conduit 24. The conduit 23 having a smaller external dimension is installed inside the conduit 24 so that the end of the conduit 23 forms an opening 26, which is situated in the same surface with the opening 25 of the conduit 24.

The conduit 24 having the larger dimension is connected to a pump 27 and thus the slurry to be shear-thinned is fed through the larger conduit 24 into the pump 27 and by means of the pump 27 the shear-thinning for the slurry is carried out. The conduit 24 is provided with a connection 28 in order to feed dilution water to slurry to be shear-thinned. On the other side, the pump 27 is connected to the smaller conduit 23, which thus operates as a discharging conduit for the shear-thinned slurry back into the thickener 22. The smaller conduit is further provided with a connection 29 through which part of the shear-thinned slurry passes the thickener 22 for further processing.

The invention claimed is:

1. Device to be used in connection with thickening and clarifying apparatuses comprising:
   a. a shear-thinning apparatus;
   b. a first conduit sized for feeding a material to be shear-thinned, wherein said material is a mud, thick slurry or other solids-containing material, and said first conduit has a first end connected to a thickening device and a second end connected to said shear-thinning apparatus; and
   c. a second conduit for returning shear-thinned material to said thickening apparatus from the shear-thinning apparatus, said second conduit having a first end connected to said thickening device and a second end connected to said shear-thinning apparatus,
   wherein one of said first ends has a smaller external dimension than the other, and said smaller first end is positioned essentially concentrically within said other first end.

2. Device according to claim 1, wherein said smaller first end forms an opening in a surface of the thickening apparatus, and said other first end forms an opening in the same surface of the thickening apparatus.

3. Device according to claim 1, wherein said first conduit comprises said smaller first end.

4. Device according to claim 1, wherein said first conduit comprises said other first end.

5. Device according to claim 1, wherein said first and second conduits are positioned essentially perpendicular to a wall of the thickening apparatus.

6. Device according to claim 1, wherein said first and second conduits are positioned essentially tangentially to a wall of the thickening apparatus.

7. Device according to claim 1, wherein said first and second conduits are positioned essentially downwards to a wall of the thickening apparatus.

8. Device according to claim 1, wherein the shear-thinning apparatus is a centrifugal pump.

9. Device according to claim 1, wherein the shear-thinning apparatus is a stroke diaphragm pump.

* * * * *